United States Patent Office 2,856,309
Patented Oct. 14, 1958

2,856,309

UNSATURATED HYDROCARBON DRYING OILS CONTAINING A HARDENING AGENT AND A PROCESS OF MAKING THEM

Anthony H. Gleason and Donald F. Koenecke, Westfield, N. J., assignors to Esso Research and Engineering Company, a corporation of Delaware No Drawing. Application February 15, 1955
Serial No. 488,421

31 Claims. (Cl. 106—285)

This invention relates to an improvement in the drying properties of liquid diolefin polymers.

It is known to prepare synthetic drying oils by polymerizing conjugated diolefins, such as butadiene, isoprene, piperylene, etc., or copolymerizing such diolefins with vinyl aromatics such as styrene, etc. The process is carried out in the presence of catalysts such as sodium, peroxides and the like. Thus, polymer oils are prepared which, when dissolved in an equal quantity of hydrocarbon solvent such as mineral spirits, generally have a viscosity between about 0.1 and 20 poises, or about 400 to 20,000 poises when diluent-free.

The oils thus obtained are particularly useful as protective coatings in the form of colorless varnishes or enamels and may be either air-dried or baked. However, it has been found by experience that the coatings, particularly the baked films, have a tendency to dry on the surface. When thicker films of the varnish or enamel are applied to metal to be cured by baking, the surface dries, sealing off the lower portion of the film thus retarding oxidation and curing with the result that a tack-free surface covering a soft substrate is obtained. The soft portion renders the film subject to marring and abrasion without appreciable force being applied. These disadvantages have restricted the application of these synthetic drying oils to films of about one mil (0.001 inch) or less in thickness. Since many uses such as home appliance finishes and primer surfacers require films of 1.5 mils or greater, it is obvious that there are many applications in which these oils are not suitable.

It is known, in accordance with the teachings of U. S. 2,652,342, that the pigment-wetting properties of the synthetic hydrocarbon drying oils can be improved by reacting the oil at 50 to 250° C. with .01 to 2.5% maleic anhydride, chloro-maleic anhydride, or citraconic anhydride. However, this treatment has little, if any, effect on the drying properties of the oil films.

In accordance with the present invention, the film-hardness of a polymer drying oil is increased by reacting the oil with an aliphatic diamine or polyamine or a salt thereof, or preferably by first reacting the oil with maleic anhydride or similar reagent as described above and then reacting this product with the diamine or polyamine or its salt. Any amount of the amine can be used from about 0.1 up to about one mole per mole of oil.

The synthetic oils to be treated in accordance with the present invention are oily polymers of butadiene, isoprene, dimethyl butadiene, piperylene, methyl pentadiene or other conjugated diolefins having four to six carbon atoms per molecule. Instead of polymerizing any of the aforesaid diolefins alone, they may be copolymerized in admixtures with each other or in admixtures with minor amounts of ethylenically unsaturated monomers, copolymerizable therewith, e. g., with 5 to 40% of styrene, styrenes having alkyl groups substituted on the ring such as paramethyl styrene, dimethyl styrene or diethyl styrene, acrylonitrile, methacrylonitrile, methyl acrylate, methyl methacrylate, vinyl isobutyl ether, methyl vinyl ketone, and isopropenyl methyl ketone. Such synthetic oils may be advantageously prepared by mass polymerization either in the presence of a hydrocarbon soluble peroxide catalyst such as benzoyl peroxide or cumene hydroperoxide, or in the presence of metallic sodium when the monomers consist of a diolefin or of a mixture of a diolefin with a styrene compound. Suitable polymerization procedures are illustrated below in Runs A and B. Throughout the present description it will be understood that all proportions are expressed on a weight basis unless otherwise specified.

Run A. For example, 100 parts of butadiene-1,3, 50 parts of straight-run mineral spirits boiling between 150 and 200° C. (Varsol), 3 parts of t-butyl hydroperoxide (70% pure) and 0.75 parts of diisopropyl xanthogen disulfide are heated in a closed reactor at about 90° C. for 40 hours, whereupon the residual pressure is released and unreacted butadiene is allowed to volatilize from the polymerized mixture at 70° C. The resulting product, which is a clear, water-white solution, consists typically of about 60 parts of oily polymer of butadiene, about 4 parts of butadiene dimer, plus solvent and some t-butyl alcohol. This solution of polymer is then preferably fractionated to remove the dimer and usually adjusted to 50% nonvolatile matter content. The nonvolatile constituent, which is the oily polymer of butadiene, has a molecular weight between 1,000 and 20,000, preferably between 3,000 and 10,000. It will be understood, of course, that the foregoing procedure is only illustrative and that it can be modified in many ways, particularly as described in U. S. Patent 2,586,594 of Arundale et al., issued on February 19, 1952, which describes alternative monomers, catalysts, reaction diluents, polymerization modifiers, suitable ranges of proportions of the various ingredients, suitable ranges of polymerization conditions, etc.

Run B. An alternative polymerization method using sodium as catalyst is illustrated as follows: 80 parts of butadiene-1,3, 20 parts of styrene, 200 parts of straight-run mineral spirits boiling between 150 and 200° C., 40 parts of dioxane, 0.2 parts of isopropanol and 1.5 parts of finely dispersed sodium are heated at about 50° C. in a closed reactor provided with an agitator. Complete conversion is obtained in about 4.5 hours whereupon the catalyst is destroyed by adding an excess of isopropanol to the polymerized charge. The crude product is cooled, neutralized with carbon dioxide or glacial acetic acid or the like and filtered. The colorless filtrate is then fractionally distilled to remove the alcohol and modifiers such as dioxane. Finally, additional hydrocarbon solvent is preferably distilled off until a product containing about 50–95% nonvolatile matter is obtained, the nonvolatile matter being a drying oil having a molecular weight below 20,000, preferably between about 3,000 to 10,000.

Again it will be understood that the described sodium polymerization method may be varied considerably as by omitting the styrene co-reactant; or by adding the styrene only after the polymerization of butadiene monomer has begun; or dioxane may be replaced by 10 to 35 parts of another ether modifier having more than 2 carbon atoms such as methyl ethyl ether, or the modifier may be omitted altogether, especially when it is not essential to obtain a perfectly colorless product. Similarly, isopropanol is not necessary, though aliphatic alcohols generally have the beneficial effect of promoting the reaction when present in amounts ranging from about 2 to 50% based on the weight of sodium catalyst. Furthermore, the mineral spirits may be replaced by other inert hydrocarbon diluents boiling between about −15° C. and 200° C., e. g. butane, benzene, xylene, cyclohexane and the like. The diluents are usually used in amounts ranging from 50 to 500 parts per 100 parts of monomer. The reaction temperature may vary between about 40° C. and 105° C., preferably around 50 to 85° C. As a catalyst, 1.0 to 10 parts of dispersed metallic sodium is used per 100 parts of monomers, sodium particle sizes below 100 microns being particularly effective.

Suitable diamines to be reacted with the above described polymer oils include ethylene diamine, propylene diamine, butylene diamine, hexamethylene diamine, and the like, polyamines such as diethylene triamine, triethylene tetramine, tetraethylene pentamine, hexamethylene tetramine, etc. The salts of these amines may also be used.

As disclosed above, before the amines or their salts are used the oil is preferably first reacted with an unsaturated organic compound having a carboxyl group or anhydride or ester thereof, e. g., maleic acid, fumaric acid, thioglycollic acid, thiosalicyclic acid, mercaptophthalic acid, itaconic acid, mesaconic acid, citraconic acid, acrylic acid or their anhydrides or esters. While these reagents may be added in any amount up to incipient gelation, amounts between 0.01% and 15% are generally suitable. The reaction is carried out at a temperature between 50 and 250° C., preferably between 180 and 220° C. The necessary time for such treatment varies between about 15 minutes and two hours depending on the temperatures employed.

Suitable salts of the above-listed amines to be reacted with the reagent-treated oil are those formed by reacting the amine with any weak acid which readily forms a salt with the amine, preferably a monobasic acid which will volatilize at baking temperatures up to about 400° F.

The reaction between the amine or amine salt and the oil, either before or after chemical treatment as above described, is carried out at a temperature between 20 and 250° C.

The following specific examples are presented to illustrate typical applications and effects of the present invention. All quantities are expressed in this specification and claims on a weight basis unless stated otherwise.

EXAMPLE I

A butadiene-styrene drying oil was prepared from the following charge:

| | Parts |
|---|---|
| Butadiene-1,3 | 80 |
| Styrene | 20 |
| Varsol [1] | 200 |
| Dioxane | 40 |
| Isopropanol | 0.2 |
| Sodium [2] | 1.5 |

[1] Straight-run mineral spirits; API gravity, 49.0; flash, 105° F.; boiling range, 150 to 200° C.; solvent power, 33–37 kauri-butanol value (reference scale: benzene—100 K. B. value, n-heptane—25.4 K. B. value).
[2] Dispersed to a particle size of 10 to 50 microns by means of an Eppenbach Homo-mixer.

The polymerization of this charge was carried out at 50° C. in a 2-liter autoclave provided with a mechanical agitator. Complete conversion was obtained in 4.5 hours. The catalyst was destroyed and removed from the resulting crude product and the product was finished by distillation of the volatile material contained therein as described in earlier parts of this specification. The resulting product had a viscosity of 1.5 poises at 50% N. V. M. and the nonvolatile portion thereof had an average molecular weight of about 10,000. A portion of the finished oil was subjected to an after-treatment which consisted in heating the oil at 200° C. for two hours in the presence of 1.0% maleic anhydride. The resulting maleic-treated oil was then poured onto thin steel panels to form coatings of 1.65 mils and baked for 30 minutes at 325° F. The baked films were found to have a Sward hardness value of about 5–8 (Glass= 100), which shows that the oil had not cured completely under a normal baking schedule.

EXAMPLE II

A 10 g. sample of the polymer oil of Example I, containing no maleic anhydride and adjusted to a 62% nonvolatile content in Varsol, was mixed with 0.5 cc. of a 4 normal solution of hexamethylene diamine in xylene. The mixture was stirred thoroughly at room temperature. No appreciable viscosity increase was observed. The mixture was poured on tinplate panels to form films for baking. The untreated oil was used as a control. The following comparative film thicknesses and Sward hardness values serve to illustrate the effectiveness of the invention. Sward hardness is in terms of percent based on plate glass at 100.

*Films baked 30' at 335° F.*

| Example II | | Control | |
|---|---|---|---|
| Thickness | Sward Hardness | Thickness | Sward Hardness |
| 1.0 mil | 26 | 1.3 mils | 3 |
| 1.3 mils | 18 | 2.1 mils | 2 |
| 1.6 mils | 8 | 2.6 mils | 0 |
| 1.85 mils | 2 | | |

*Films baked 30' at 300° F.*

| Example II | | Control | |
|---|---|---|---|
| Thickness | Sward Hardness | Thickness | Sward Hardness |
| 1.33 mils | 21 | 1.4 mils | 11 |
| 1.6 mils | 5 | 1.8 mils | 3 |
| 1.9 mils | 2 | 2.2 mils | 0 |

It is evident that the baked films embodying this invention are at least twice as high as the control films in Sward hardness values at thicknesses of about 1.4 mils.

EXAMPLE III 10 g. of the maleic anhydride-treated polymer oil of Example I (at 62% nonvolatile content) was mixed with 0.02 g. of hexamethylene diamine diacetate

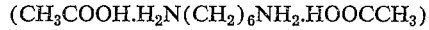
$(CH_3COOH.H_2N(CH_2)_6NH_2.HOOCCH_3)$ and then heated to 160° C. in order to disperse the salt in the polymer oil. The mixture was cooled and 4 cc. of Varsol added to reduce the final viscosity somewhat. Films were prepared by pouring on tinplate panels and cured by baking. The original maleic anhydride-treated oil was used as a control. The following observations were made on film thicknesses and hardness. Films were baked 30 min. at 340° F.

| Example III | | Control | |
|---|---|---|---|
| Thickness | Sward Hardness | Thickness | Sward Hardness |
| 1.2 mils | 35 | 1.2 mils | 15 |
| 1.6 mils | 18 | 1.7 mils | 10 |
| 1.8 mils | 17 | 2.2 mils | 4 |

From these examples it is evident that the hardness of thicker films of polymer oil, e. g., those films up to about 2 mils thickness, is nearly doubled where the composition contains a diamine or a diamine salt according to this invention.

EXAMPLE IV

Another batch of polymer oil was prepared as described in Example I and treated with 1% maleic anhydride. The finished oil showed a viscosity of 2.4 poises at 50% N. V. M. One portion of this oil was combined with 0.25% hexamethylene diamine and the mixture homogenized by an agitator wheel overnight, sample (A). To another portion was added 0.17% of triethylene tetramine, sample (B). Films prepared on panels of cold rolled steel were baked 30 minutes at 325° F. and then tested for Sward hardness with the following results:

| Control | | Sample A | | Sample B | |
|---|---|---|---|---|---|
| Thickness | Sward | Thickness | Sward | Thickness | Sward |
| 1.37 mils | 24 | 1.42 mils | 32 | 1.42 mils | 30 |
| 1.42 mils | 21 | 1.42 mils | 37 | 1.50 mils | 26 |
| 1.52 mils | 17 | 1.52 mils | 28 | 1.60 mils | 20 |
| 1.60 mils | 13 | 1.57 mils | 26 | | |
| 1.62 mils | 15 | | | | |

From these data it is clear that in both A and B the addition of a polyamine to the maleic anhydride treated polymer oil resulted in a very substantial increase in the hardness of the baked films.

It is not intended that the examples included should limit the concentrations of the diamine or its salt. For example, percentages may be as low as 0.01% or as high as 5% or until the excess begins to act as an inhibitor to drying. Other diamines may be used such as butylene diamines, ethylene diamine, or even polyamines such as triethylene tetramine. Other acids such as formic, propionic or any weak acid which forms a salt with an amine readily can be used. Preferably, a monobasic acid and one which will volatilize at the baking temperature should be selected.

The use of this invention broadens the potential uses of polymer oil to include baking finishes applied in thicker films such as for home appliances and other manufactured articles.

The nature of the present invention having been thus fully set forth and specific examples of the same given, what is claimed as new and useful and desired to be secured by Letters Patent is:

1. A process for improving the hardness of films prepared from liquid butadiene polymers which comprises reacting the oil with about 0.1 to one mole of a film hardening agent chosen from the group consisting of hexamethylene diamine, hexamethylene diamine diacetate, and triethylene tetramine.

2. Process according to claim 1 in which the oil is preliminarily reacted at a temperature between 50 and 250° C. with from 0.01% to an amount just below that capable of producing incipient gelation of a reagent selected from the group consisting of the anhydrides of maleic acid, fumaric acid, thioglycolic acid, thiosalicylic acid, mercaptophthalic acid, itaconic acid, mesaconic acid, citraconic acid, and acrylic acid and the resulting product then reacted with the film hardening agent.

3. A coating composition consisting essentially of a liquid butadiene polymer and as a film hardening agent therefor a compound chosen from the group consisting of hexamethylene diamine, hexamethylene diamine diacetate, and triethylene tetramine.

4. A coating composition consisting essentially of a liquid copolymer of butadine-1,3 and styrene and as a film hardening agent therefor a compound chosen from the group consisting of hexamethylene diamine, hexamethylene diamine diacetate, and triethylene tetramine.

5. A process for improving the hardness of films prepared from liquid copolymers of butadiene-1,3 and styrene which consists essentially in reacting the liquid copolymer with about 0.1 to 1 mole of a film hardening agent chosen from the group consisting of hexamethylene diamine, hexamethylene diamine diacetate, and triethylene tetramine.

6. A coating composition comprising a liquid butadiene polymer, from 0.01% to an amount just below that capable of producing incipient gelation of a compound selected from a group consisting of the anhydrides of maleic acid, fumaric acid, thioglycolic acid, thiosalicylic acid, mercaptophthalic acid, itaconic acid, mesaconic acid, citraconic acid, and acrylic acid, and as a film hardening agent therefor a compound chosen from the group consisting of hexamethylene diamine, hexamethylene diamine diacetate, and triethylene tetramine.

7. A process for improving the hardness of films prepared from liquid copolymers of butadiene-1,3 and styrene which consists essentially in reacting the liquid copolymer with about 0.1 to 1 mole of hexamethylene diamine.

8. A process for improving the hardness of films prepared from liquid copolymers of butadiene-1,3 and styrene which consists essentially in reacting the liquid copolymer with about 0.1 to 1 mole of hexamethylene diamine diacetate.

9. A process for improving the hardness of films prepared from liquid copolymers of butadiene-1,3 and styrene which consists essentially in reacting the liquid copolymer with about 0.1 to 1 mole of triethylene tetramine.

10. A process for improving the hardness of films prepared from polymeric unsaturated hydrocarbon drying oils which comprises first reacting the oil at a temperature between 50 and 250° C. with from 0.01% to an amount which will cause gelation of a reagent selected from the group consisting of the anhydrides of maleic acid, fumaric acid, thioglycolic acid, thiosalicylic acid, mercaptophthalic acid, itaconic acid, mesaconic acid, citraconic acid, and acrylic acid, then reacting the resulting product with about 0.1 to about 1 mole of hexamethylene diamine.

11. A process for improving the hardness of films prepared from polymeric unsaturated hydrocarbon drying oils which comprises first reacting the oil at a temperature between 50 and 250° C. with from 0.01% to an amount which will cause gelation of a reagent selected from the group consisting of the anhydrides of maleic acid, fumaric acid, thioglycolic acid, thiosalicylic acid, mercaptophthalic acid, itaconic acid, mesaconic acid, citraconic acid, and acrylic acid, then reacting the resulting product with about 0.1 to about 1 mole of hexamethylene diamine diacetate.

12. A process for improving the hardness of films prepared from polymeric unsaturated hydrocarbon drying oils which comprises first reacting the oil at a temperature between 50 and 250° C. with from 0.01% to an amount which will cause gelation of a reagent selected from the group consisting of the anhydrides of maleic acid, fumaric acid, thioglycolic acid, thiosalicylic acid, mercaptophthalic acid, itaconic acid, mesaconic acid, citraconic acid, and acrylic acid, then reacting the resulting product with about 0.1 to about 1 mole of triethylene tetramine.

13. A process for improving the hardness of films prepared from liquid butadiene polymers which comprises reacting the oil with about 0.1 to 1 mole of hexamethylene diamine.

14. A process for improving the hardness of films prepared from liquid butadiene polymers which comprises reacting the oil with about 0.1 to 1 mole of hexamethylene diamine diacetate.

15. A process for improving the hardness of films prepared from liquid butadiene polymers which comprises reacting the oil with about 0.1 to 1 mole of triethylene tetramine.

16. A coating composition comprising a liquid butadiene polymer, from 0.01% to an amount just below that capable of producing incipient gelation of the compound selected from the group consisting of the anhydrides of maleic acid, fumaric acid, thioglycolic acid, thiosalicylic acid, mercaptophthalic acid, itaconic acid, mesaconic acid, citraconic acid, and acrylic acid, and as a film hardening agent therefor hexamethylene diamine.

17. A coating composition comprising a liquid butadiene polymer, from 0.01% to an amount just below that capable of producing incipient gelation of the compound selected from the group consisting of the anhydrides of maleic acid, fumaric acid, thioglycolic acid, thiosalicylic acid, mercaptophthalic acid, itaconic acid, mesaconic acid, citraconic acid, and acrylic acid, and as a film hardening agent therefor hexamethylene diamine diacetate.

18. A coating composition comprising a liquid butadiene polymer, from 0.01% to an amount just below that capable of producing incipient gelation of the compound selected from the group consisting of maleic acid, fumaric acid, thioglycolic acid, thiosalicylic acid, mercaptophthalic acid, itaconic acid, mesaconic acid, citraconic acid, acrylic acid and the esters and anhydrides thereof, and as a film hardening agent therefor triethylene tetramine.

19. A process for improving the hardness of films prepared from liquid butadiene polymers which comprises first reacting the oil at a temperature between 50 and 250° C. with from 0.01% to an amount which will cause gelation of maleic anhydride and then reacting the resulting product with about 0.1 to 1 mole of hexamethylene diamine.

20. A process for improving the hardness of films prepared from liquid butadiene polymers which comprises first reacting the oil at a temperature between 50 and 250° C. with from 0.01% to an amount which will cause gelation of maleic anhydride and then reacting the resulting product with about 0.1 to 1 mole of hexamethylene diamine diacetate.

21. A process for improving the hardness of films prepared from liquid butadiene polymers which comprises first reacting the oil at a temperature between 50 and 250° C. with from 0.01% to an amount which will cause gelation of maleic anhydride and then reacting the resulting product with about 0.1 to 1 mole of triethylene tetramine.

22. A process for improving the hardness of films prepared from liquid copolymers of butadiene and styrene which comprises first reacting the oil at a temperature between 50 and 250° C. with from 0.01% to an amount which will cause gelation of maleic anhydride and then reacting the resulting product with hexamethylene diamine.

23. A process for improving the hardness of films prepared from liquid copolymers of butadiene and styrene which comprises first reacting the oil at a temperature between 50 and 250° C. with from 0.01% to an amount which will cause gelation of maleic anhydride and then reacting the resulting product with hexamethylene diamine diacetate.

24. A process for improving the hardness of films prepared from liquid copolymers of butadiene and styrene which comprises first reacting the oil at a temperature between 50 and 250° C. with from 0.01% to an amount which will cause gelation of maleic anhydride and then reacting the resulting product with triethylene tetramine.

25. A coating composition comprising a reaction product of a liquid butadiene polymer, from 0.01% to an amount just below that capable of producing incipient gelation of maleic anhydride and 0.1 to 1 mole of hexamethylene diamine.

26. A coating composition comprising a reaction product of a liquid butadiene polymer, from 0.01% to an amount just below that capable of producing incipient gelation of maleic anhydride and 0.1 to 1 mole of hexamethylene diamine diacetate.

27. A coating composition comprising a reaction product of a liquid butadiene polymer, from 0.01% to an amount just below that capable of producing incipient gelation of maleic anhydride and 0.1 to 1 mole of triethylene tetramine.

28. A coating composition comprising a reaction product of a liquid copolymer of butadiene and styrene, from 0.01% to an amount just below that capable of producing incipient gelation of maleic anhydride and 0.1 to 1 mole of hexamethylene diamine.

29. A coating composition comprising a reaction product of a liquid copolymer of butadiene and styrene, from 0.01% to an amount just below that capable of producing incipient gelation of maleic anhydride and 0.1 to 1 mole of hexamethylene diamine diacetate.

30. A coating composition comprising a reaction product of a liquid copolymer of butadiene and styrene, from 0.01% to an amount just below that capable of producing incipient gelation of maleic anhydride and 0.1 to 1 mole of triethylene tetramine.

31. A process for improving the hardness of films prepared from polymeric unsaturated hydrocarbon drying oils which comprises first reacting the oil at a temperature between 50° and 250° C. with from 0.01% to an amount which will cause gelation of a reagent selected from the group consisting of the anhydrides of maleic acid, fumaric acid, thioglycolic acid, thiosalicylic acid, mercaptophthalic acid, itaconic acid, mesaconic acid, citraconic acid, and acrylic acid, then reacting the resulting product with about 0.1 to about 1 mole of a film hardening agent chosen from the group consisting of hexamethylene diamine, hexamethylene diamine diacetate, and triethylene tetramine.

References Cited in the file of this patent

UNITED STATES PATENTS

| | | |
|---|---|---|
| 2,306,830 | Paul | Dec. 29, 1942 |
| 2,364,186 | Berworth | Dec. 5, 1944 |
| 2,395,507 | Sauser | Feb. 26, 1946 |
| 2,398,468 | Schultze et al. | Apr. 16, 1946 |
| 2,412,942 | Berworth | Dec. 24, 1946 |
| 2,638,460 | Crouch | May 12, 1953 |
| 2,652,342 | Gleason | Sept. 15, 1953 |